(12) United States Patent
Roberts, Sr. et al.

(10) Patent No.: US 8,841,564 B1
(45) Date of Patent: Sep. 23, 2014

(54) WEIGH SCALED VEHICLE CALIBRATION SYSTEMS AND METHODS

(71) Applicant: R+L Carriers, Inc., Wilmington, OH (US)

(72) Inventors: Ralph L. Roberts, Sr., Reddick, FL (US); Chris Deck, Wilmington, OH (US)

(73) Assignee: R+L Carriers, Inc., Wilmington, OH (US)

( * ) Notice: Subject to any disclaimer, the term of this patent is extended or adjusted under 35 U.S.C. 154(b) by 0 days.

(21) Appl. No.: 13/872,403

(22) Filed: Apr. 29, 2013

(51) Int. Cl.
*G01G 19/08* (2006.01)
*G01G 23/01* (2006.01)

(52) U.S. Cl.
CPC ..................................... *G01G 23/01* (2013.01)
USPC ......... 177/25.13; 177/1; 177/25.19; 177/136; 177/139; 702/101

(58) Field of Classification Search
USPC ............ 177/1, 25.12, 25.13, 25.19, 136–141, 177/145–149; 702/101, 102, 173–175
See application file for complete search history.

(56) References Cited

U.S. PATENT DOCUMENTS

| | | | | |
|---|---|---|---|---|
| 4,402,391 A * | 9/1983 | Tuten et al. | ................... | 194/213 |
| 5,178,226 A * | 1/1993 | Bowman et al. | ............. | 177/139 |
| 5,191,543 A * | 3/1993 | Berthel et al. | ................ | 702/101 |
| 5,245,137 A * | 9/1993 | Bowman et al. | ............. | 177/139 |
| 5,256,835 A | 10/1993 | Rydzak | | |
| 5,306,875 A * | 4/1994 | Schmitzek | ................ | 177/25.15 |
| 5,640,334 A * | 6/1997 | Freeman et al. | ............. | 702/101 |
| 5,661,268 A * | 8/1997 | Freeman et al. | ................... | 177/1 |
| 5,878,376 A * | 3/1999 | Schurr | .......................... | 702/102 |
| 6,576,849 B2 * | 6/2003 | Bliss et al. | ................. | 177/25.13 |
| 7,441,436 B2 * | 10/2008 | Bliss et al. | ..................... | 73/1.13 |
| 7,497,137 B2 | 3/2009 | Tellenbach et al. | | |
| 7,516,035 B2 * | 4/2009 | Tellenbach et al. | .......... | 702/105 |
| 7,533,799 B2 | 5/2009 | Edwards | | |
| 7,870,776 B1 | 1/2011 | Whitney et al. | | |
| 8,120,467 B2 | 2/2012 | Ehrman et al. | | |
| 2009/0119051 A1 * | 5/2009 | Murray et al. | ................ | 702/101 |
| 2010/0063762 A1 * | 3/2010 | Pechstein et al. | ............... | 702/85 |
| 2010/0147049 A1 * | 6/2010 | Haussmann et al. | .......... | 73/1.13 |

FOREIGN PATENT DOCUMENTS

WO    20120101325    8/2012

OTHER PUBLICATIONS

Sansata Technologies, Sensors Keep Forklifts Righted and Production Steady, undated.

* cited by examiner

*Primary Examiner* — Randy W Gibson
*Assistant Examiner* — Natalie Huls
(74) *Attorney, Agent, or Firm* — Dinsmore & Shohl LLP (57) ABSTRACT

A weigh scaled vehicle calibration system includes a weigh scaled vehicle comprising a field scale unit and an electronic computing device comprising a processor and memory electrically coupled to one another. The memory stores a set of computer readable instructions that, when executed by the processor cause the processor to: receive data from the field scale unit corresponding to a first weighing event of a first test weight, receive an identification tag corresponding to the first test weight, and compare the data corresponding to the first weighing event to a first reference weight of the first test weight to calculate a first calibration value. The processor further stores the first calibration value in the memory, compares the first calibration value to prior calibration values stored in the memory, and generates a feedback report of the field scale unit based at least in part on the comparison of the calibration values.

30 Claims, 4 Drawing Sheets

WEIGH SCALED VEHICLE CALIBRATION SYSTEMS AND METHODS

TECHNICAL FIELD

The present disclosure relates generally to weigh scaled vehicle calibration systems and methods, and in one embodiment to such systems and methods, predicting weigh scaled vehicle calibration trends.

BACKGROUND

The shipping industry includes large customers that fill trucks or trailers with freight loads designated for various destinations. These large customers may have distribution facilities, shipping hubs, terminals, or warehouses that are several acres large for receiving, consolidating, and distributing freight. Freight loads may include small packages destined for residential addresses or bulky pallets of materials weighing several thousand pounds destined for businesses. The large customers may be responsible for delivering the packages to other distribution facilities or to final destinations. When shipments arrive at the large customer's distribution facility or warehouse, weigh scaled vehicles may be employed to weigh freight or to move packages from one location to another, and also to load or unload trailers. Weigh scales included in these weigh scaled vehicles may be subjected to strenuous loads and less than ideal work environments. Weigh scale failure may be costly as the weigh scaled vehicle may need to be taken out of service for a length of time during which it may not be used as maintenance service is provided. Improper weigh scale maintenance may also lead to faulty weight measurements, uncalibrated weigh scales, and non-compliance with regulations, which may result in increased costs associated with reweighs and incorrect billing. Accordingly, alternative methods and systems for weigh scaled vehicle calibration are desired.

SUMMARY

According to one embodiment, a weigh scaled vehicle calibration system includes a weigh scaled vehicle comprising a field scale unit and an electronic computing device comprising a processor and memory electrically coupled to one another. The memory stores a set of computer readable instructions that, when executed by the processor cause the processor to: receive data from the field scale unit corresponding to a first weighing event of a first test weight, receive an identification tag corresponding to the first test weight, and compare the data corresponding to the first weighing event to a first reference weight of the first test weight to calculate a first calibration value. The processor further stores the first calibration value in the memory, compares the first calibration value to prior calibration values stored in the memory, and generates a feedback report of the field scale unit based at least in part on the comparison of the calibration values.

According to another embodiment, a method for predicting weigh scaled vehicle calibration trends includes receiving, by a computer comprising a processor and memory, a first identification tag associated with a first test weight and a field scale identifier from a field scale unit, determining a first reference weight associated with the first identification tag from a computer-readable look-up table, and receiving data from the field scale unit corresponding to a first weighing event. The method also provides for comparing the data corresponding to the first weighing event to the first reference weight to calculate a first calibration value, storing the first calibration value, comparing the first calibration value to prior calibration values, and generating a feedback report of the field scale unit.

BRIEF DESCRIPTION OF THE DRAWINGS

While the specification concludes with claims particularly pointing out and distinctly claiming the present inventions, it is believed the same will be better understood from the following description taken in conjunction with the accompanying drawings in which:

The embodiments set forth in the drawings are illustrative and exemplary in nature and not intended to be limiting of the inventions defined by the claims. Moreover, the individual features of the drawings will be more fully apparent and understood in view of the detailed description.

DETAILED DESCRIPTION

Figure 1:
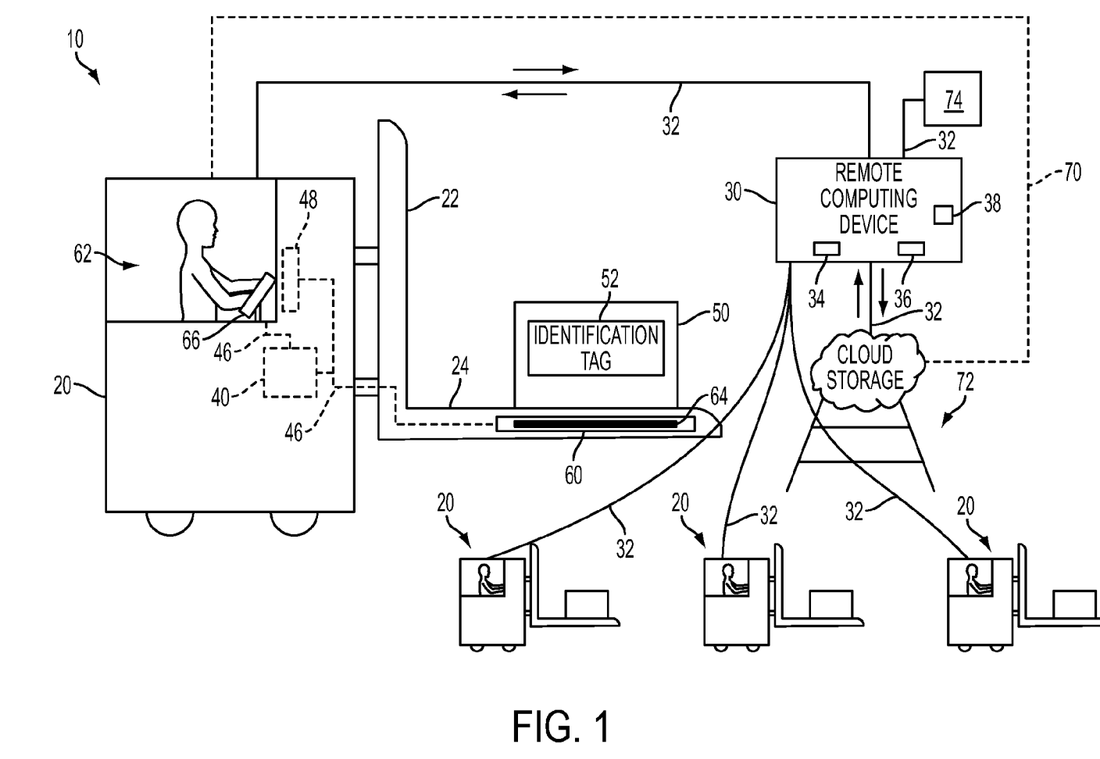
FIG. 1 is a schematic illustration of one embodiment of a weigh scaled vehicle calibration system according to one or more embodiments shown and described herein.

Referring generally to FIG. 1, one embodiment of a weigh scaled vehicle calibration system is illustrated. Regulations for weight measurements provided by weigh scales may allow certain tolerances for weigh scale calibration. Accordingly, weigh scales may be subject to testing to determine calibration values at fixed or random time intervals. In the weigh scaled vehicle calibration system shown in FIG. 1, a weigh scaled vehicle may include any vehicle equipped with a weigh scale, for example a forklift. The weigh scaled vehicle includes a field scale unit positioned on a loading platform used to lift freight. The field scale unit includes a weigh scale that may be used to weigh freight loaded on the loading platform. The weigh scaled vehicle may also include a controller, having a processor and a memory, electrically coupled to the field scale unit, as well as a display electrically coupled to the controller.

The weigh scaled vehicle calibration system may also include a plurality of test weights, each having a unique identification tag. A weigh scaled vehicle operator may load the test weight onto the loading platform, allowing the field scale unit to determine a weight measurement for the test weight. The weigh scaled vehicle operator may input the identification tag for the test weight into the controller, or the controller may automatically obtain the identification tag of the test weight, for example by radio frequency identification (RFID). The controller may then determine a reference weight for the test weight using a look-up table stored on the memory. The reference weight may be a true weight value for the test weight. The controller may then compare the weight measurement of the test weight provided by the field scale unit to the reference weight of the test weight to determine a current calibration value.

The controller may then transmit the current calibration value, as well as field scale unit identification data, to an electronic computing device. The electronic computing device may be onboard the weigh scaled vehicle, or may be a remote computing device as shown in FIG. 1. The electronic computing device may compare the current calibration value for the field scale unit to historical prior calibration values for the field scale unit. The electronic computing device may then generate a feedback report for the field scale unit, which may include action items, and transmit the feedback report to the field scale unit or to another computer. The feedback report may include a predicted calibration trend as determined by the electronic computing device, based on the current calibration value, prior calibration values, the amount of time between the prior calibration values and the current calibration value, or a service history of the field scale unit. The electronic computing device may also store the current calibration value and feedback report locally or in cloud storage. The weigh scaled vehicle calibration system may allow for preventative maintenance recommendations, automatic scheduling of maintenance, action items, and calibration certification for field scale units. Various embodiments of the weigh scaled vehicle calibration system will be discussed in detail herein.

Referring now to FIG. 1, a weigh scaled vehicle calibration system 10 includes a weigh scaled vehicle 20 with a field scale unit 60, an electronic computing device 30, and a test weight 50 having an identification tag 52. The field scale unit 60 may be attached to or integrated into the weigh scaled vehicle 20 and includes, among other components, a weigh scale 64 operable to detect a weight of a mass positioned on a loading platform 24 of the weigh scaled vehicle 20. The field scale unit 60 is electrically coupled to a controller 40 and transmits information to the controller through a communication link 46. The controller 40 may include a processor 42 and a memory 44, and is also electrically coupled to a display 48 and a driver input device 66.

In this embodiment of the weigh scaled vehicle calibration system 10, a weigh scaled vehicle operator 62 directs the weigh scaled vehicle 20 to the test weight 50. The test weight 50 is loaded onto the loading platform 24 of the weigh scaled vehicle 20. The weigh scaled vehicle operator 62 may then either lift the test weight 50 using a lifting mechanism 22, or allow the field scale unit 60 to determine a weight measurement without lifting the test weight 50. The controller 40 identifies the test weight 50 using the identification tag 52 and determines a reference weight from a look-up table stored in the memory 44. The field scale unit 60 determines a weight measurement of the test weight 50 using the weigh scale 64 and transmits the weight measurement to the controller 40 through communication link 46. The controller 40 determines a current calibration value for the field scale unit by comparing the weight measurement to the reference weight, or true weight, of the test weight 50. The reference weight may be stored in a look-up table and associated with the identification tag 52 of the test weight 50. The controller 40 may then transmit the current calibration value to the electronic computing device 30, shown in FIG. 1 as remote computing device 30. The remote computing device 30 analyzes the information, as will be discussed in detail herein, and may transmit a feedback report to the controller 40 or other computers.

The weigh scaled vehicle 20, in this embodiment depicted as a forklift, may be used to weigh freight, load or unload freight to or from trailers, or to transport freight from one location to another. The weigh scaled vehicle 20 may be an indoor or outdoor mobile vehicle and may have a range of load handling capabilities from about 100 pounds to over 10,000 pounds. The weigh scaled vehicle includes the lifting mechanism 22 and the loading platform 24, where freight may be loaded or unloaded prior to being lifted. The loading platform 24 may include multiple platform arms or may be a solid continuous platform. The weigh scaled vehicle operator 62 operates the lifting mechanism 22 using the driver input device 66 such that when freight is loaded onto the loading platform 24, the freight is lifted in an upwards direction, away from a ground surface until the lifting mechanism 22 reaches a height determined by the weigh scaled vehicle operator 62 or a fixed maximum height. Similarly, the weigh scaled vehicle operator 62 may operate the lifting mechanism 22 such that the lifting mechanism 22 is lowered in a downwards direction, lowering the freight until the lifting mechanism 22 reaches a ground surface and at which point freight may be unloaded from the loading platform 24. The weigh scaled vehicle 20 may also include additional components, for example accelerometers, Global Positioning System (GPS) devices, wireless transceivers, gyroscopes, or weigh scaled vehicle identifying tags, such as RFID tags or computer readable barcodes. These components may be electrically coupled to the controller 40 and allow the controller 40 to store speed, impact, usage, and other information. For example, accelerometers may be used to determine sudden changes in speed of the weigh scaled vehicle 20, which may indicate that the weigh scaled vehicle 20 has impacted another structure or been involved in an accident. Data collected from accelerometers may be recorded and associated with a driver, which may allow for additional training and/or disciplinary measures to be implemented for frequent abuse. Weigh scaled vehicle speed may also be monitored and recorded in order to prevent abusive operation of the weigh scaled vehicle 20. The amount of weight lifted may also be monitored and recorded, and also associated with an operator, for abuse prevention, in cases where weights in excess of a maximum upper limit or rated capacity are lifted. The weigh scaled vehicle 20 may further include temperature and/or humidity sensors electrically coupled to the controller 40, which may allow for the tracking and recording of environmental conditions the weigh scaled vehicle 20 is exposed to. Environmental abuse may also be monitored, for example if the weigh scaled vehicle 20 is exposed to rainfall or other hazardous environments.

The weigh scaled vehicle 20 may also include the display 48, the driver input device 66, and the field scale unit 60. The display 48 may be a light emitting diode (LED) display, organic LED display, touchscreen display, or cathode ray tube display, for example. The display 48 may provide the weigh scaled vehicle operator 62 with an electronic interface that communicates information to the weigh scaled vehicle operator 62, or allows the weigh scaled vehicle operator 62 to control certain inputs and/or functions of the weigh scaled vehicle 20. For example, the display 48 may provide the weigh scaled vehicle operator 62 with information relating to the amount of weight on the loading platform 24, a speed of the weigh scaled vehicle 20, a date and time, current operator identification, a trailer identifier, or a job number. The driver input device 66 may include physical or electronic controls that allow the weigh scaled vehicle operator 62 to input information that is received by the controller 40. Such information can include a vehicle operator identifier, a weight measurement, the identification tag 52 for the test weight 50, a lift or lower command, a destination, and other inputs.

The weigh scaled vehicle 20 includes the field scale unit 60. The field scale unit 60 may be incorporated into the loading platform 24, may be externally attached to the loading platform 24, or may be positioned below an upper surface of the loading platform 24. The field scale unit 60 may be removable from the weigh scaled vehicle 20. The field scale unit 60 may be centered on the loading platform 24 and may include one or more weigh scales 64. For example, the loading platform 24 may include multiple platforms arms, and the field scale unit 60 may therefore include one weigh scale 64 per platform arm. In another example, the loading platform 24 may be a continuous solid platform, in which case the field scale unit 60 may include a single weigh scale 64 centered on the platform, or several weigh scales 64 positioned proximate to edges of the loading platform 24. The weigh scale 64 may have a definite upper weight limit after which weight measurements determined by the weigh scale 64 may no longer be accurate. For example, the weigh scale 64 may have an upper weight limit of 1,000 pounds, corresponding to an upper weight limit of the scale capability.

The field scale unit 60 is electrically coupled to the controller 40 and transmits data through the communication link 46. The communication link 46 may be implemented as a bus or other electronic interface to facilitate communication between the components of the weigh scaled vehicle 20, including the display 48, the driver input device 66, the field scale unit 60, and the controller 40. The field scale unit 60 may detect the weight of freight loaded onto the loading platform 24 using the weigh scale 64. The weigh scale 64 provides a weight measurement that the field scale unit 60 transmits to the controller 40. The controller 40 may then relay the weight measurement to be shown on the display 48.

Figure 2:
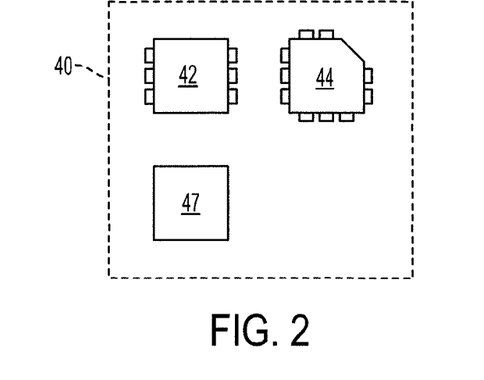
FIG. 2 is a schematic illustration of an electronic computing device according to one or more embodiments shown and described herein.

Referring to FIG. 1, the controller 40 is electrically coupled to the display 48, the driver input device 66, and the field scale unit 60 via the communication link 46. As detailed in FIG. 2, the controller 40 includes the processor 42 and memory 44. The processor 42 may include any electrical processing component configured to receive and execute instructions (for example from the memory 44). The memory 44 may be non-transitory, with computer readable instructions stored on the memory 44. The memory 44 may be configured as non-volatile computer readable media and may include hard disk drives, flash memory, registers and/or other types of storage components. Additionally, the memory 44 may be configured to store operating logic that may be embodied as a computer program, firmware, or hardware.

The controller 40 may also include a transceiver 47 (shown on FIG. 2) electrically coupled to the processor 42 and memory 44 for communication with other computers, including transmitting and/or receiving data through communication links 32 or 70 (shown on FIG. 1). The transceiver 47 may communicate with the electronic computing device 30 through communication link 32, or with a cloud storage server 72 thorough communication link 70, as will be discussed in detail below. The transceiver 47 may utilize various communication systems to transmit or receive data. Examples of communication systems that could be used to transmit data include the following broad categories: analogue telephones; digital telephones; high frequency (HF), very high frequency (VHF), or ultra-high frequency (UHF) radio transmitters; cellular telephone; satellite communication systems; or IEEE 802.11 WiFi, IEEE 802.16 WiMAX or other future wireless communication protocols. The distance over which the communications links 32, 70 must be reliable will determine which communication system is utilized. For short distances (line of sight), cellular telephone and VHF/UHF radio links may be utilized. Medium distance transmission (line of sight to 100 miles) may use cellular telephones or HF radio links. Longer distance communications may use cellular telephone or satellite communication systems, for example.

Figure 3:
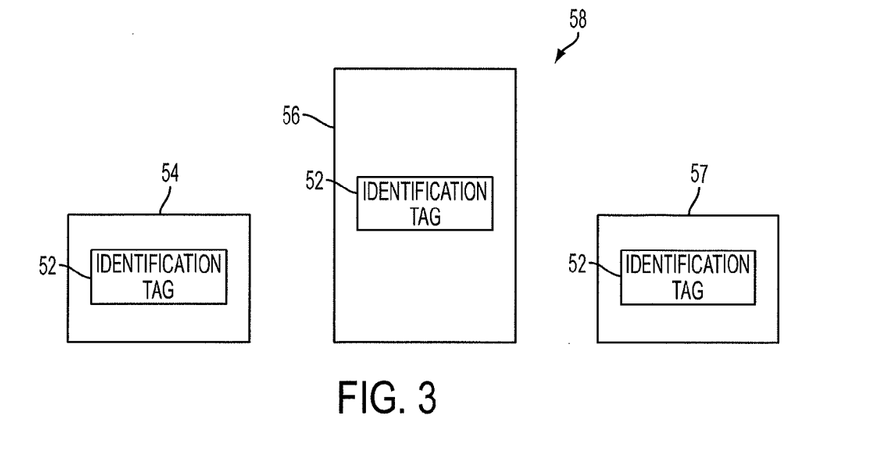
FIG. 3 depicts various test weights according to one or more embodiments shown and described herein.

Referring now to FIG. 3, a plurality of test weights 58 in addition to the test weight 50 are illustrated. A first test weight 54 has a small size, a second test weight 56 has a large size, and a third test weight 57 has a medium size. The test weights 58 may have different physical weights and masses, for example, the first test weight 54 may have a weight of 1,000 pounds; the second test weight 56 may have a weight of 7,500 pounds; and the third test weight 57 may have a weight of 5,000 pounds. Each of the test weights 50, 54, 56, 57 has the unique test weight identification tag 52 discussed above. The identification tag 52 is unique to each of the test weights 50, 54, 56, 57 and allows for each of the test weights 50, 54, 56, 57 to be identified. The identification tag 52 may be any identification device, including any one of: a unique number or alphanumeric code printed on a surface of the test weight or printed on a label affixed to the test weight 50, 54, 56, 57, a computer readable barcode, an RFID tag, a Quick Response Code (QR code), or the like. Although the test weights 58 in FIG. 3 are shown as different physical sizes, test weights 58 having different weights yet identical sizes may be also provided, depending on the material composition and construction of the test weight. Similarly, test weights 58 having different shapes, for example shapes that conform to the loading platform 24 may also be provided, as well as test weights 58 with weights other than specific weights described herein.

Referring again to FIG. 1, the electronic computing device 30 may be a remote computing device 30, as shown in FIG. 1. In this embodiment, the remote computing device 30 is shown at a location external to a warehouse or structure in which the weigh scaled vehicle 20 is positioned. In other embodiments, the remote computing device 30 may be located within the same warehouse or structure as the weigh scaled vehicle 20. The remote computing device 30 includes a processor 34 and a memory 36 electrically coupled to one another. The remote computing device 30 may also include a transceiver 38 electrically coupled to the processor 34 and memory 36. The remote computing device 30 may have communication link 32 to the weigh scaled vehicle 20, as well as to the cloud storage server 72 and a third party computer 74. The cloud storage server 72 may be used to backup the remote computing device 30 or to store information or data provided to the cloud storage server 72 by the remote computing device 30. The third party computer 74 may be a maintenance office computer, a scheduling computer, a regulatory compliance computer, or a different computer as discussed in detail below. In other embodiments of the weigh scaled vehicle calibration system 10, the electronic computing device may not be a remote computing device. Instead, the electronic computing device 30 may be onboard the weigh scaled vehicle 20. For example, the controller 40 may serve as the electronic computing device 30. In this example, the controller 40 performs the functions of the remote computing device 30. Also, the controller 40 may include the transceiver 47 and communicate with the cloud storage server 72, such that the cloud storage server 72 serves to backup the memory 44 of the controller 40, or the controller 40 may communicate directly with the third party computer 74.

As discussed herein above, regulations for weight measurements may allow certain tolerances for weigh scale calibration, and weigh scales may thus be subject to testing to determine calibration values after fixed or random time intervals. At certain random times or fixed time intervals, or for instantaneous calibration values, embodiments of the weigh scaled vehicle calibration system 10 disclosed herein may be utilized to determine a current calibration value of the weigh scale 64 positioned within specific field scale unit 60.

In the embodiment of the weigh scaled vehicle calibration system 10 depicted in FIG. 1, the weigh scaled vehicle operator 62 commences a weighing event by directing the weigh scaled vehicle 20 to the test weight 50 and loading the test weight 50 onto the loading platform 24. The controller 40 identifies the test weight using the identification tag 52, as discussed above. The weigh scaled vehicle operator 62 may input the identification tag 52 directly using the driver input device 66, which may include a barcode scanner, or the controller may automatically receive the identification tag 52 using the transceiver 47. When the controller 40 receives the identification tag 52 for the test weight 50, the controller 40 may determine a reference weight associated with the identification tag 52 using a look-up table stored in the memory 44. The reference weight may be a true weight value of the test weight 50, such as a numerical value that corresponds to an actual physical weight of the test weight 50. The field scale unit 60 uses the weigh scale 64 to detect a weight measurement of the test weight 50 and transmits the weight measurement to the controller 40. The controller 40 receives the weight measurement and compares the reference weight to the weight measurement and determines a current calibration value, which may be, for example, 10 pounds over reference weight for a current calibration value of "+10." In another example, if the reference weight is 5,000 pounds and the weight measurement is 4,995 pounds, the controller 40 may determine a current calibration value of "−5." In other embodiments, the controller 40 may not compare the weight measurement to the reference weight to determine a calibration value, or may not determine the reference weight for the test weight identification. Instead, each of these steps may be performed by the remote computing device 30.

In this embodiment, the controller 40 may transmit the current calibration value as well as certain field scale unit identification data to the remote computing device 30 through communication link 32. The field scale identification data may include a date, a time, a weigh scaled vehicle operator identifier, a weigh scaled vehicle identifier, a weigh scaled vehicle service history, or any additional driver input data. The controller 40 may also submit the current calibration value and field scale unit identification data to the cloud storage server 72 directly through communication link 70 for storage. In some embodiments, the controller 40 may perform an initial check before transmitting the calibration value and field scale identification data to the remote computing device 30. The initial check may allow the controller 40 to determine if the field scale unit 60 is beyond a predetermined maximum allowed calibration value, and if so, to inform the weigh scaled vehicle operator 62 to immediately terminate operation of the weigh scaled vehicle 20. For example, the weigh scaled vehicle 20 may have a maximum allowed calibration value, or tolerance, of "+/−100." If the reference weight of the identification tag 52 of the test weight 50 is 1,000 pounds, and the weight measurement of the weigh scale 64 is 1,200 pounds, the initial check performed by the controller 40 may alert the weigh scaled vehicle operator 62 to terminate use of the weigh scaled vehicle 20. In other embodiments, if the field scale unit 60 is removable, the controller 40 may advise the weigh scaled vehicle operator 62 to replace the field scale unit 60.

The remote computing device 30 receives the current calibration value and the field scale unit identification data from the controller 40 and searches memory 36 for stored prior calibration values for the field scale unit 60. If no prior calibration values exist, the remote computing device 30 may store the current calibration value. The remote computing device 30 compares the current calibration value (considered a first calibration value) for the field scale unit 60 against the prior calibration values (considered a second calibration value, a third calibration value, etc.) for the field scale unit 60 and determines a calibration trend for the field scale unit 60. The calibration trend is based on the current calibration value, the prior calibration values, and the time in between calibration values. For example, the field scale unit 60 may have four prior calibration values, each separated by a one month time period. This may indicate that the field scale unit 60 has been subjected to monthly calibration checks. The remote computing device 30 may analyze the first prior calibration value and determine that the field scale unit had a second calibration value of "+1." The remote computing device 30 may then analyze the second, third, and fourth prior calibration values points to determine that the field scale unit had third, fourth, and fifth calibration values of "+2," "+3," and "+4," respectively. The remote computing device 30 may then include the current calibration value, of, for example, "+5," as a first calibration value to form a data set for the specific field scale unit 60. Using the data set formed for the specific field scale unit 60, the remote computing device 30 may then extrapolate to determine a predicted calibration trend of the field scale unit. Continuing the above example, assume a maximum calibration tolerance of +/−10 is allowed for the field scale unit 60. Since each of the prior calibration values points are spaced one month apart with the calibration value increasing by 1 every month, the remote computing device 30 may determine that the field scale unit 60 may have a calibration value of "+10" within a period of five months, as the calibration trend indicates the field scale unit 60 has calibration values that increase by "+1" every month, and in five months, the calibration value may increase "+5" from its current calibration value. Based on this extrapolation, the remote computing device 30 may create a feedback report with an estimated service interval of 4 months, as will be discussed below. In one exemplary embodiment, the remote computing device 30 may also utilize official calibration records and shipper disputed reweigh measurements in generating feedback reports, as discussed below.

In another example, the field scale unit 60 may not have linearly time spaced prior calibration values, so the remote computing device 30 will consider the amount of time that has passed between each calibration value during extrapolation. Also, the field scale unit 60 may not have linear progressions in calibration values. The remote computing device 30 may adjust a feedback report based on rapidly increasing or decreasing calibration values, or calibration values that change rapidly within a short amount of time.

In other embodiments, the remote computing device 30 may also determine the reference weight and weight measurements for each of the historical prior calibration values points individually rather than analyzing the calibration values alone, to determine if the field scale unit 60 has greater or lower calibration values for different weight ranges. For example, if a first prior calibration values point is "+1" for a test weight having a reference weight of 1,000 pounds, and a second prior calibration values point a day later of "+100" for a test weight having a reference weight of 7,500 pounds, the remote computing device 30 may determine that the field scale unit 60 is not reliable for weight measurements exceeding a certain weight.

Additionally, the remote computing device 30 may consider the weigh scaled vehicle identifier, weigh scaled vehicle operator identifier, and weigh scaled vehicle service history in generating a feedback report. For example, if a field scale unit 60 has calibration values exceeding certain predefined limits and the same weigh scaled vehicle operator identifier associated with many of the calibration points, the remote computing device 30 may flag the weigh scaled vehicle operator for improper use. Additionally, if a field scale unit has just been recalibrated according to its service history, yet has a calibration value of "+1," the remote computing device 30 may establish a new baseline for the field scale unit accordingly. Similarly, if a field scale unit has a service history with multiple recalibrations within a short amount of time, the remote computing device 30 may implement more stringent calibration tolerances for that field scale unit to ensure proper performance. In one exemplary embodiment, the remote computing device 30 may further utilize tracking and/or correlating official calibration or certification records, as well as shipper disputed reweigh measurements in generating a feedback report. For example, a weigh scaled vehicle repeatedly out of calibration or with a high rate of reweigh measurements may be subject to a reduced service interval recommendation.

The remote computing device 30 may generate a feedback report for the field scale unit 60. The feedback report may include a calibration trend, an estimated service interval calculated as described, a compliance indicator indicating compliance with predetermined calibration value limits, an updated field scale unit history with prior calibration values, and other items of interest. The feedback report may also include action items, including service due within a certain timeframe, no action required, immediate service required, retest immediately, retest within a certain timeframe, or other action items. The action items may be displayed such that the weigh scaled vehicle 20 may not be operated without confirmation of acknowledgement by the weigh scaled vehicle operator 62.

The remote computing device 30 may transmit the feedback report directly to the controller 40 through communication link 32, and/or to a third party computer 74 through communication link 32, for example a service computer in a maintenance office of the warehouse, or directly to a maintenance scheduling computer. The remote computing device 30 may also transmit the feedback report to the cloud storage server 72. The feedback report may be received directly by the controller 40 and displayed on the display 48. The weigh scaled vehicle operator 62 may take any actions needed or schedule a maintenance operation. Alternatively, the remote computing device 30 may automatically schedule a maintenance operation based on the feedback report. Other items may be included in the feedback report, including notifications and alarms. For example, if a field scale unit 60 needs immediate service, an audible alarm may be sent to the controller 40 to alert the weigh scaled vehicle operator 62. Similarly, feedback reports may be sent as notifications via e-mail, text message, instant message, or other electronic communication to maintenance personnel, shift managers, or other parties.

Figure 4:
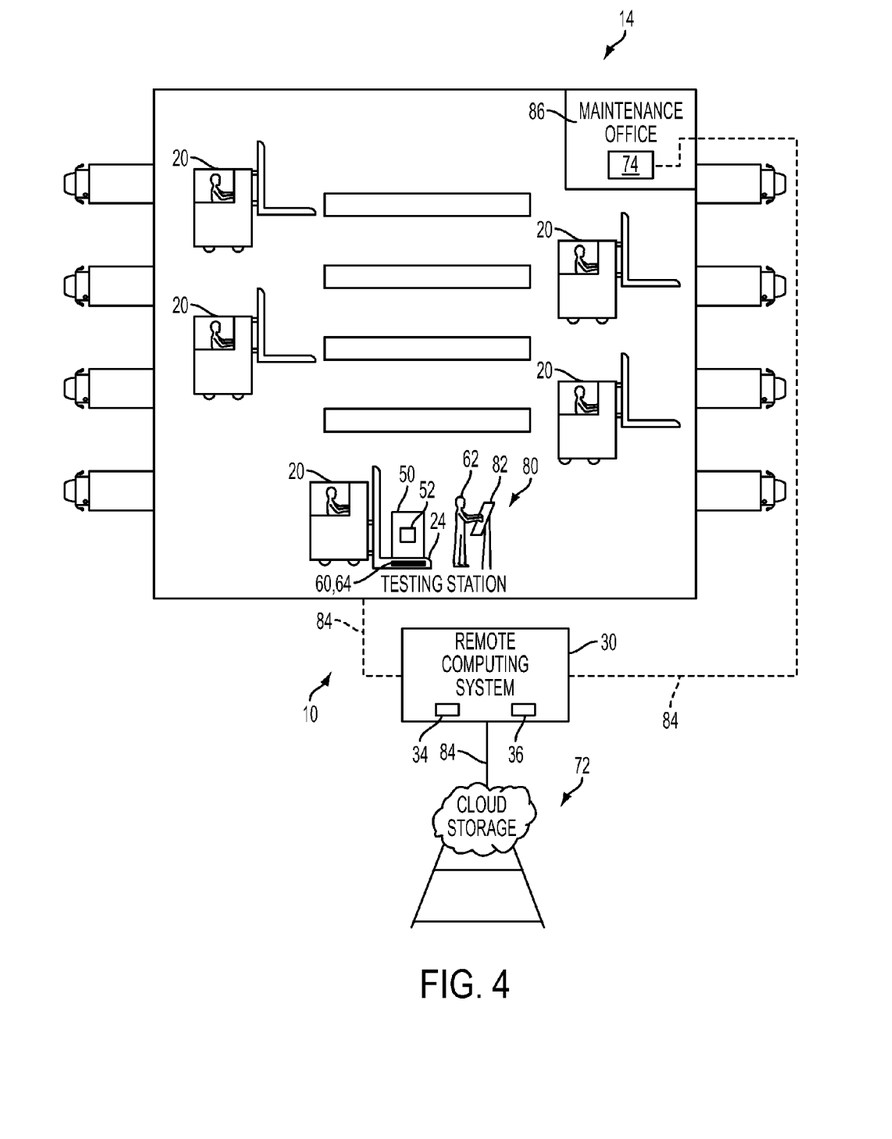
FIG. 4 is a schematic illustration of another embodiment of a weigh scaled vehicle calibration system according to one or more embodiments shown and described herein.

Referring now to FIG. 4, another embodiment of the weigh scaled vehicle calibration system 10 is shown. In this embodiment, a warehouse 14 includes weigh scaled vehicles 20, a maintenance office 86, and a testing station 80. The weigh scaled vehicle calibration system 10 in this embodiment also includes the remote computing device 30, cloud storage server 72, and the third party computer 74, shown in FIG. 4 as a computer in the maintenance office 86.

The testing station 80 may include a testing computer 82 and the test weight 50. In this embodiment, the testing computer 82 is included and is in communication with the remote computing device 30 through communication link 84. Other exemplary embodiments may not include a testing computer. The testing station 80 may be located at a designated location within the warehouse 14. Weigh scaled vehicles 20 may report to the testing station 80 at predetermined times. The weigh scaled vehicle operator 62 directs the weigh scaled vehicle 20 to the testing station 80 and loads the test weight 50 onto the loading platform 24. The weigh scaled vehicle operator 62 then inputs the test weight identification tag 52 into the testing computer 82, as well as a weight measurement provided by the weigh scale 64 of the field scale unit 60 on the weigh scaled vehicle 20. The testing computer 82 transmits the information input by the weigh scaled vehicle operator 62 to the remote computing device 30, or may generate the feedback report locally. The testing computer 82 may transmit the information input by the weigh scaled vehicle operator 62 immediately or at predetermined times, for example at the end of a work shift. The testing computer 82 may perform the initial check, as discussed above.

After receiving the information from the testing computer 82, the remote computing device 30 may generate a feedback report and transmit it to the testing computer 82. The remote computing device 30 may also transmit the information, including the generated feedback report, to the cloud storage server 72, as well as to the maintenance office computer 74 to confirm calibration or to schedule maintenance. In other embodiments, the testing computer 82 may communicate directly with the maintenance office computer 74, or the testing computer 82 may perform the functions of the remote computing device 30. This embodiment may be cost-effective as individual weigh scaled vehicles may not be equipped with transceivers or controllers capable of executing the set of instructions described herein.

Figure 5:
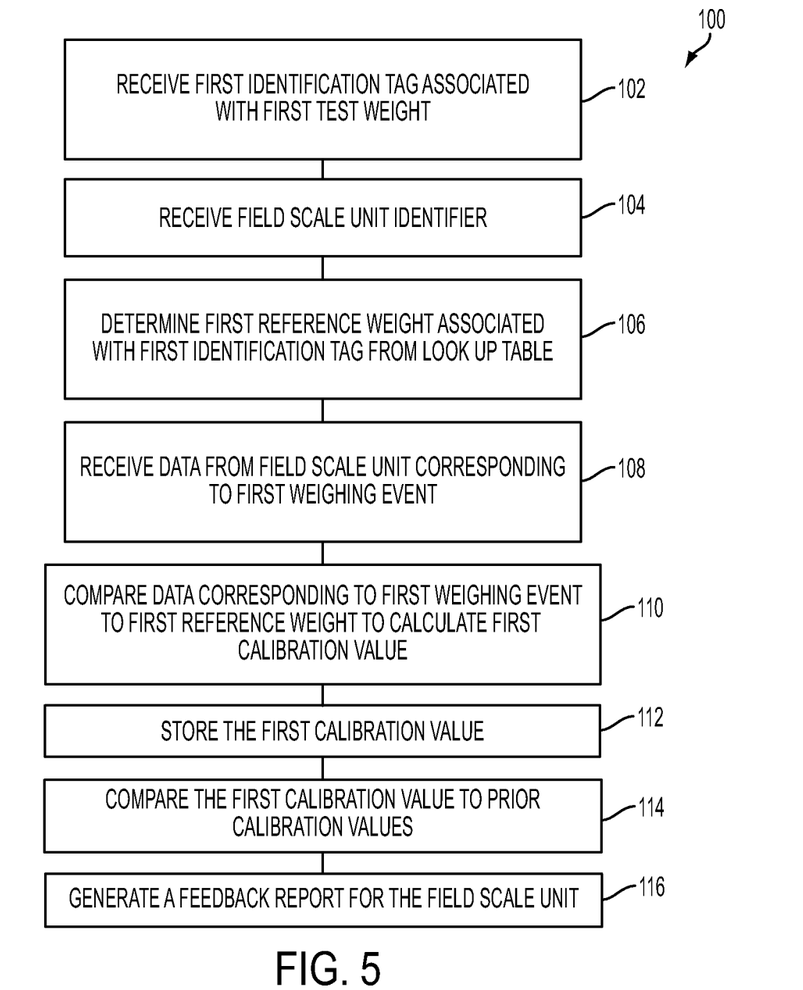
FIG. 5 depicts one method of predicting weigh scaled vehicle trends according to one or more embodiments shown and described herein.

Referring now to FIG. 5, a method for predicting weigh scaled vehicle calibration trends 100 includes steps 102 and 104 of receiving, automatically by a computer comprising a processor and memory, a first identification tag associated with a first test weight and a field scale identifier from a field scale unit. The method 100 further includes step 106 of determining a first reference weight associated with the first identification tag from a computer-readable look-up table and step 108 of receiving data from the field scale unit corresponding to a first weighing event, as well as step 110 of comparing the data corresponding to the first weighing event to the first reference weight to calculate a first calibration value, and step 112 of storing the first calibration value. Step 114 of the method 100 includes comparing the first calibration value to the prior calibration values, and step 116 includes generating a feedback report for the field scale unit.

The feedback report transmitted by the remote computing device 30 may allow for scheduling of preventative maintenance prior to field scale unit 60 failure, which may result in reduced downtime for weigh scaled vehicles 20. The feedback report may also allow for calibration trending indications and allow the weigh scaled vehicle operator 62 or other users easy access to calibration information for individual field scale units 60, which may reduce reweighs and conflicting weight measurements between shippers and carrier.

The method and system of the illustrated embodiments of the present disclosure may also provide one or more of the following advantages: identification of field scale unit calibration; calibration trends of specific field scale units; preventative maintenance suggestions for field scale units; automatic maintenance scheduling for weigh scaled vehicles and field scale units; reduced downtime for weigh scaled vehicles; weigh scaled vehicle and field scale unit usage; specific calibration information for field scale units; and estimated service intervals for field scale units.

The foregoing description of the embodiments has been presented for purposes of illustration and description. It is not intended to be exhaustive or to limit the disclosure to the precise form disclosed. Many alternatives, modifications, and variations will be apparent to those skilled in the art in light of the above teaching. Accordingly, it is intended to embrace all alternatives, modifications, and variations that fall within the spirit and broad scope of the claims.

What is claimed is:

1. A weigh scaled vehicle calibration system comprising:
a weigh scaled vehicle comprising a field scale unit;
an electronic computing device comprising a processor and memory electrically coupled to one another, the memory storing a set of computer readable instructions that, when executed by the processor cause the processor to:
receive data from the field scale unit corresponding to a first weighing event of a first test weight;
receive an identification tag corresponding to the first test weight;
compare the data corresponding to the first weighing event to a first reference weight of the first test weight to calculate a first calibration value;
store the first calibration value in the memory;
compare the first calibration value to prior calibration values stored in the memory to predict a calibration trend; and
generate a feedback report of the field scale unit based at least in part on the comparison of the calibration values, wherein the feedback report comprises the predicted calibration trend based on the first calibration value, the prior calibration values stored in the memory, and an amount of time between each of the prior calibration values and the first calibration value.

2. The weigh scaled vehicle calibration system of claim 1, wherein the electronic computing device is attached to the field scale unit.

3. The weigh scaled vehicle calibration system of claim 2, wherein the weigh scaled vehicle is a forklift.

4. The weigh scaled vehicle calibration system of claim 1, wherein the field scale unit comprises a transceiver and receiver for transmitting and receiving information electronically.

5. The weigh scaled vehicle calibration system of claim 4, wherein the electronic computing device is a remote computing device.

6. The weigh scaled vehicle calibration system of claim 4, wherein the set of computer readable instructions, when executed by the processor, further cause the processor to transmit the feedback report to another computer using electronic communication.

7. The weigh scaled vehicle calibration system of claim 6, wherein the feedback report is transmitted at a predetermined time interval.

8. The weigh scaled vehicle calibration system of claim 1, wherein the set of computer readable instructions, when executed by the processor, further cause the processor to perform an initial calibration check to determine if the first calibration value exceeds a predetermined permissible calibration range.

9. The weigh scaled vehicle calibration system of claim 8, wherein the permissible calibration range is a regulatory range.

10. The weigh scaled vehicle calibration system of claim 8, wherein a user, a manager, a maintenance employee, or a third party is alerted with a notification if the first calibration value exceeds the permissible calibration range.

11. The weigh scaled vehicle calibration system of claim 10, wherein the notification is one of an email message, a text message, an audible alarm, or a computer error message delivered to the weigh scaled vehicle, a maintenance office, a testing station, or a mobile electronic device.

12. The weigh scaled vehicle calibration system of claim 1, wherein the set of computer readable instructions, when executed by the processor, further cause the processor to calculate an estimated service interval of the field scale unit based on the first calibration value and the prior calibration values, and the time between the first calibration value and the prior calibration values.

13. The weigh scaled vehicle calibration system of claim 1, wherein the set of computer readable instructions, when executed by the processor, further cause the processor to receive a field scale unit identifier by user input, image capture, or RFID.

14. The weigh scaled vehicle calibration system of claim 1, wherein the reference weight is stored in a look-up table in the memory.

15. The weigh scaled vehicle calibration system of claim 1, wherein the feedback report includes at least one of a date, a time, an operator, an estimated service interval, an action item, a notification, the first calibration value, or the prior calibration values.

16. The weigh scaled vehicle calibration system of claim 15, wherein the action item comprises one of no service required, immediate service required, or service due within a certain amount of time.

17. The weigh scaled vehicle calibration system of claim 1, wherein the feedback report further comprises at least one prevention maintenance recommendation for the field scale unit.

18. The weigh scaled vehicle calibration system of claim 1, wherein the set of computer readable instructions, when executed by the processor, further cause the processor to automatically schedule maintenance for the field scale unit.

19. A method for predicting weigh scaled vehicle calibration trends comprising:
receiving, by a computer comprising a processor and memory, a first identification tag associated with a first test weight and a field scale identifier from a field scale unit;
determining a first reference weight associated with the first identification tag from a computer-readable look-up table;
receiving data from the field scale unit corresponding to a first weighing event;
comparing the data corresponding to the first weighing event to the first reference weight to calculate a first calibration value;
storing the first calibration value;
comparing the first calibration value to prior calibration values;
predicting, using the computer, a calibration trend based on the first calibration value, the prior calibration values, and an amount of time between each of the prior calibration values and the first calibration value; and
generating a feedback report of the field scale unit, wherein the feedback report comprises the predicted calibration trend.

20. The method of claim 19, wherein the computer is mounted on a weigh scaled vehicle.

21. The method of claim 20, wherein the weigh scaled vehicle is a forklift.

22. The method of claim 19, wherein the computer is a remote computer in the proximity of the weigh scaled vehicle.

23. The method of claim 22, further comprising a communication link between the remote computer and the weigh scaled vehicle.

24. The method of claim 19, further comprising transmitting the feedback report to another computer through electronic communication.

25. The method of claim 19, further comprising performing a compliance calibration check to determine if the first calibration value exceeds a predetermined permissible calibration range.

26. The method of claim 25, wherein a user, a manager, a maintenance employee, or a third party is alerted with a notification if the first calibration value exceeds the permissible calibration range.

27. The method of claim 26, wherein the notification is one of an email message, a text message, an audible alarm, or a computer error message delivered to the weigh scaled vehicle, a maintenance office, a testing station, or a mobile electronic device.

28. The method of claim 19, wherein the first identification tag is one of a computer readable barcode, an RFID tag, or a QR code.

29. The method of claim 19, wherein the feedback report includes at least one of a date, a time, an operator, an estimated service interval, an action item, a notification, the first calibration value, or the prior calibration values.

30. The method of claim 29, wherein the action item comprises one of no service required, immediate service required, or service due within a certain amount of time.

* * * * *